United States Patent [19]

Ito et al.

[11] Patent Number: 5,450,550
[45] Date of Patent: Sep. 12, 1995

[54] PARALLEL PROCESSING SYSTEM FOR PARALLEL PREFETCHING OF IDENTICAL PACKET HAVING TWO RENDERING COMMANDS AND PROCESSING SECOND COMAND PRIOR TO COMPLETION OF PROCESSING THE FIRST COMMAND

[75] Inventors: Kazumasa Ito, Tokyo; Hiroshi Kato, Kanagawa; Junichi Fujita, Tokyo, all of Japan

[73] Assignee: Sony Corporation, Japan

[21] Appl. No.: 922,675

[22] Filed: Jul. 30, 1992

[30] Foreign Application Priority Data

Aug. 9, 1991 [JP] Japan .................. 3-225016
Feb. 4, 1992 [JP] Japan .................. 4-048019

[51] Int. Cl.⁶ .................. G06F 13/00; G06F 13/378
[52] U.S. Cl. .................. 395/821; 395/375; 395/800; 395/200.03; 395/119; 364/236.4; 364/239.4; 364/932.2; 364/948; 364/DIG. 1
[58] Field of Search .................. 395/275, 375, 800; 364/236.4, 236.6, 239.4, 239.51, 239.6, 248.2, 932.2, 932.4, 932.6, 939.81, 948, 948.3, 952.5, 952.6

[56] References Cited

U.S. PATENT DOCUMENTS

| 4,933,841 | 6/1990 | Mori et al. | 364/200 |
| 5,025,408 | 6/1991 | Sherman | 364/759 |
| 5,179,672 | 1/1993 | Genduso et al. | 395/375 |
| 5,241,637 | 8/1993 | Skruhak et al. | 395/375 |
| 5,287,466 | 2/1994 | Kodama | 395/375 |

*Primary Examiner*—Thomas C. Lee
*Assistant Examiner*—Rehana P. Kriek
*Attorney, Agent, or Firm*—Limbach & Limbach; Charles P. Sammut

[57] ABSTRACT

A rendering system for processing rendering command packets includes a plurality of prefetch circuits which are supplied with a rendering command packet including a rendering command and a parameter and prefetch a next rendering command packet during processing of the former rendering command packet, and a plurality of primitive creating circuits coupled in parallel, each of the primitive creating circuits being coupled to associated one of the prefetch circuits to start processing the next rendering command packet when completing the processing of the former rendering command packet.

6 Claims, 13 Drawing Sheets

PARALLEL PROCESSING SYSTEM FOR PARALLEL PREFETCHING OF IDENTICAL PACKET HAVING TWO RENDERING COMMANDS AND PROCESSING SECOND COMAND PRIOR TO COMPLETION OF PROCESSING THE FIRST COMMAND

BACKGROUND OF THE INVENTION

1. Field of the Invention

This invention relates to a rendering system and, more particularly, to such a rendering system for processing a common rendering command packet in parallel by a plurality of processors.

2. Description of the Prior Art

One of existing procedures processes a common rendering command packet in parallel by a plurality of processors in order to improve the rendering capacity. In this specification, a rendering command packet GCP includes a rendering command GC and zero or more parameters GP as shown in FIG. 1. The rendering command GC designates an object to be rendered (for example, a triangle) as shown in FIG. 1. The parameters GP indicate vertices, color, Z-value, and so forth, as shown in FIG. 1. Each of these parameters: vertices, color, Z-value, and so on, is held in the form of a pair of data and an address assigned to a register for storing the data.

The existing rendering system is explained below with reference to FIGS. 1 to 3. Let the system use four processors, for example. FIG. 2 shows processors LP0, LP1, LP2, and LP3 coupled in parallel. A rendering command packet GCP is supplied to the respective processors LP0, LP1, LP2, and LP3 through a terminal 101 shown in FIG. 2. The processors LP0 to LP3 create, for example, a triangle TR10 shown in FIG. 3 on the basis of the rendering command packet GCP supplied. The triangle TR10 is created in such a manner that each of the processors LP0, LP1, LP2, and LP3 creates pixels PXij in an area assigned to it.

In FIG. 3, the abscissa is the X axis and the ordinate is the Y axis. Numerals attached to the X and Y axes indicate the coordinate data (X, Y) on the X-Y coordinate plane. The figure indicated by the rendering command packet is the triangle TR10 having pixels PX60, PX66, and PX06 as its vertices as shown in FIG. 3.

In FIG. 3, the processor LP0 creates corresponding pixels that are necessary for forming a triangle TR10 defined by indicated vertices when the Y coordinate data is "0", "4" and "8". For example, when the Y coordinate data is "0", a pixel PX60 in an area ARLP01 is created. When the Y coordinate data is "4", pixels PX24, PX34, PX44, PX54 and PX64 which form an area ARLP02 are created.

In the same manner, the other processors LP1, LP2 and LP3 also create pixels PXij in areas assigned to the respective processors LP1, LP2 and LP3. That is, the processor LP1 creates pixels that form areas ARLP11 and ARLP12 when the Y coordinate data is "1", "5", . . ., respectively. The processor LP2 creates pixels that form areas ARLP21 and ARLP22 when the Y coordinate data is "2", "6", . . ., respectively. The processor LP3 creates pixels that form areas ARLP31, . . . when the Y coordinate data is "3", "7", . . ., respectively.

As described above, in the existing system configured to process a common rendering command packet GCP by a plurality of processors LP0 to LP3 in parallel, the processing of the image data by the plurality of processors LP0 to LP3 was executed in synchronization with each rendering command packet GCP as shown in FIG. 4.

FIG. 4 shows, at A, an aspect of processing of rendering command packets GCP1 to GCP4. FIG. 4 also shows, at B, operating periods of the processor LP0 and waiting periods in which the processor LP0 remains waiting until subsequent rendering command packet GCP is given; at C, such periods of the processor LP1; at D, such periods of the processor LP2; and at E, such periods of the processor LP3. In FIG. 4, boxes with symbols are periods in which rendering command packets GCP are processed, and hatched boxes are waiting periods.

It is shown in FIG. 4 that processing of image data in the plurality of processors LP0 to LP3 is executed in synchronization with each rendering command packet GCP. Therefore, in order to undertake processing of a subsequent rendering command packet GCP(i+1), it is essential that processing of a current rendering command packet GCP(i) be completed in all of the processors LP0 to LP3. As a result, it is difficult to remove or reduce the waiting time and hence to reduce the time for processing the entire image data. Additionally, for each rendering command packet GCP, the processing speed of the entire system is determined by a processor that needs the longest processing time.

OBJECT AND SUMMARY OF THE INVENTION

It is therefore an object of the invention to provide a rendering system that can process rendering command packets in a successive manner by minimizing affection to each processor from other processors.

According to an aspect of the invention, there is provided a rendering system for processing rendering command packets, comprising: a plurality of prefetch circuits which are supplied with a rendering command packet including a rendering command and a parameter and prefetch a next rendering command packet during processing of the former rendering command packet; and a plurality of primitive creating circuits coupled in parallel, each of the primitive creating circuits being coupled to associated one of the prefetch circuits to start processing the next rendering command packet when completing the processing of the former rendering command packet.

The invention will now be further described in connection with the following portions of this application when taken in conjunction with the attached drawings.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

An embodiment of the invention is explained below with reference to FIGS. 5 to 16.

Figure 1:
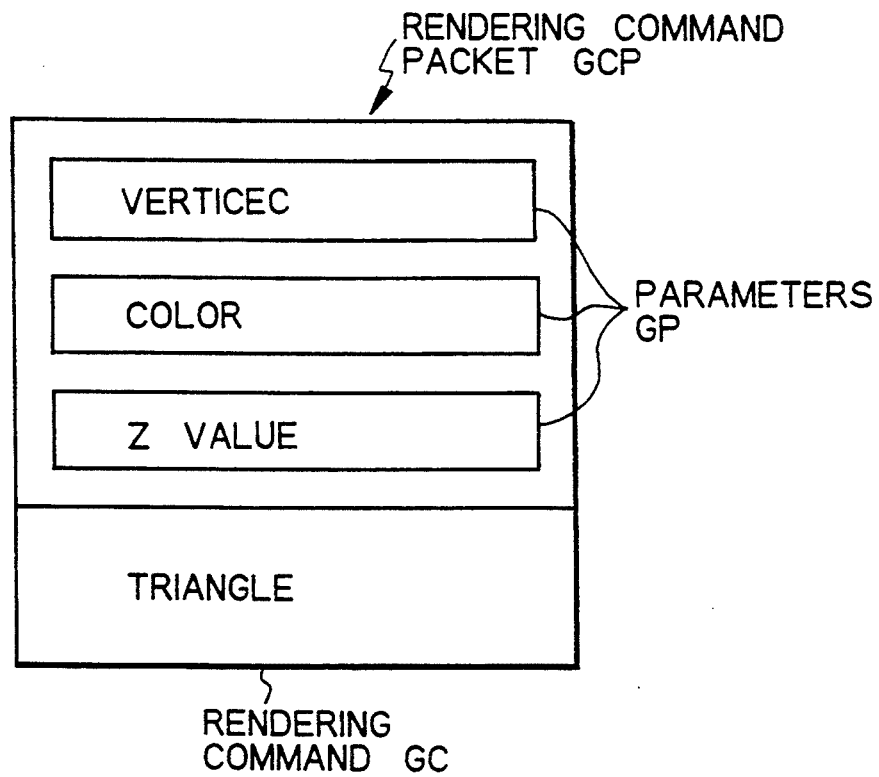
FIG. 1 is an explanatory view of an existing example showing construction of a rendering command packet.
Figure 2:
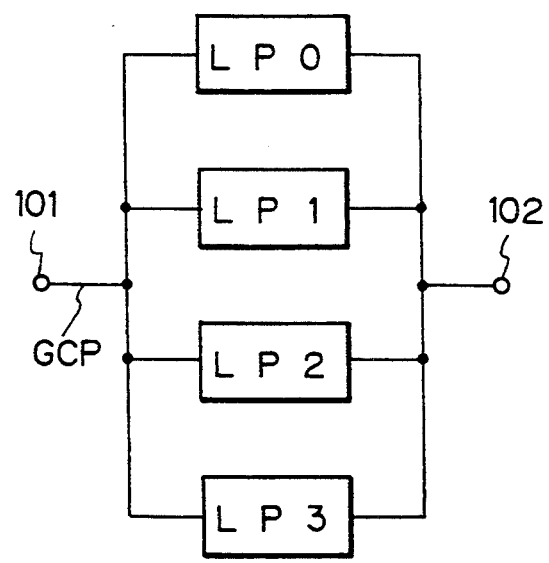
FIG. 2 is a block diagram of the existing example in which a triangle is rendered by a plurality of processors.
Figure 3:
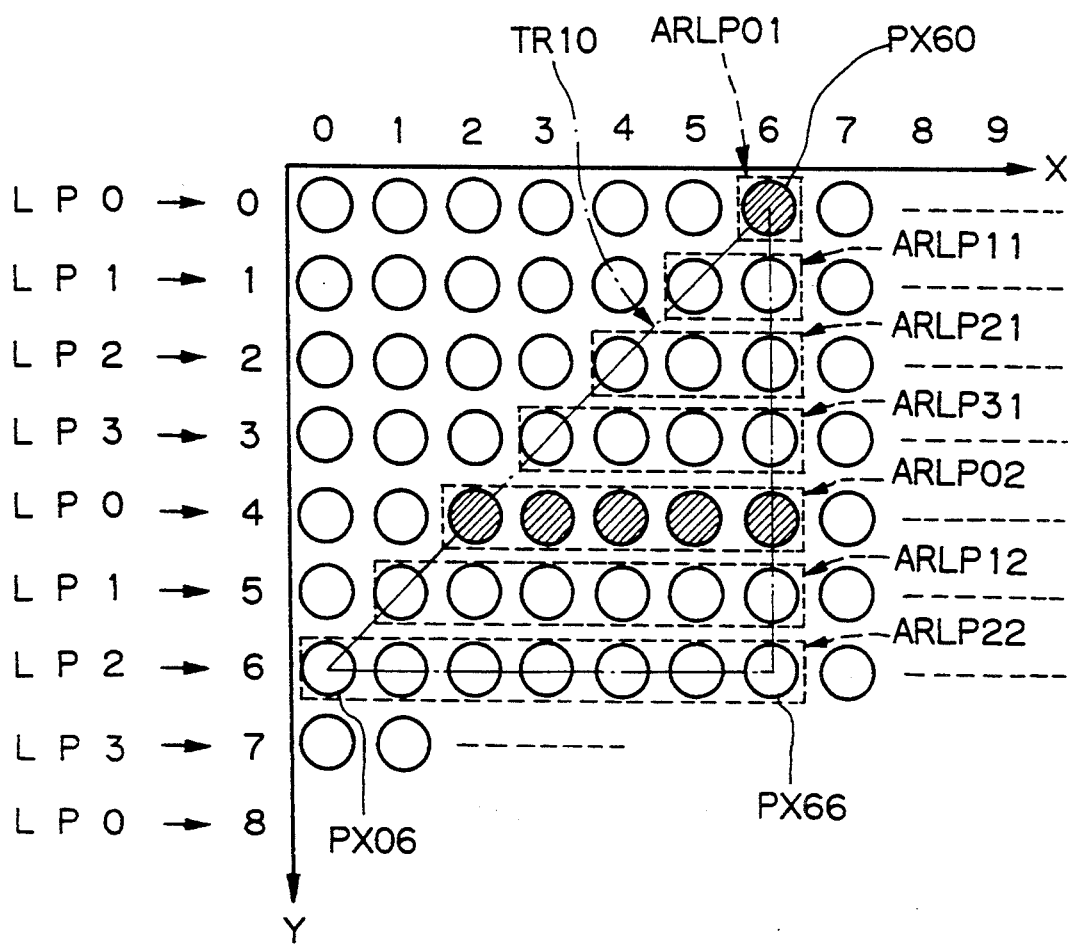
FIG. 3 is an explanatory view of the existing example which shows a way of rendering by the plurality of processors.
Figure 4:
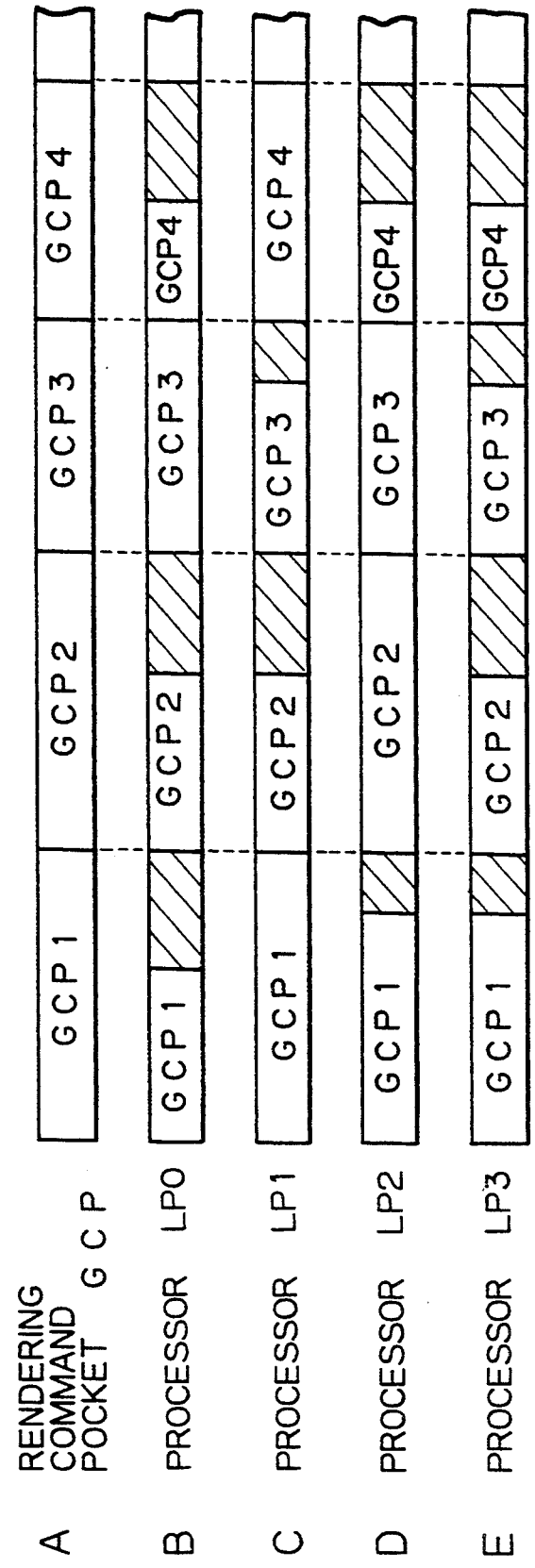
FIG. 4 is an explanatory view of the existing example which shows processing status and waiting time of the respective processors.
Figure 5:
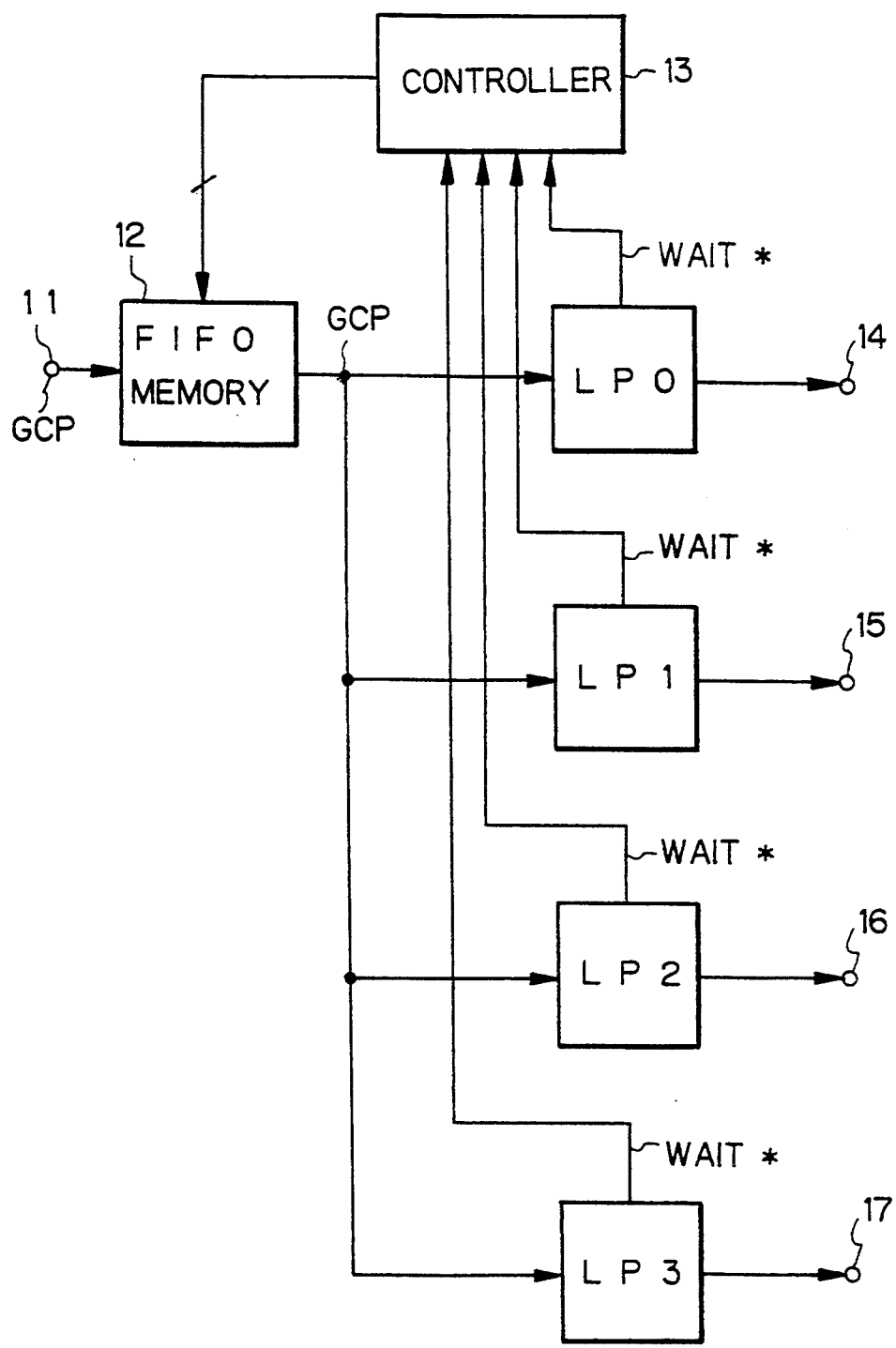
FIG. 5 is a block diagram of the entirety of an embodiment of the invention.

Construction of a rendering system taken as this embodiment is shown in FIG. 5. In the construction of FIG. 5, a rendering command packet GCP supplied through a terminal 11 is given to and latched in FIFO memory (hereinafter simply called memory) 12. The rendering command packets GCP are shown in detail in FIG. 6.

Figure 6:
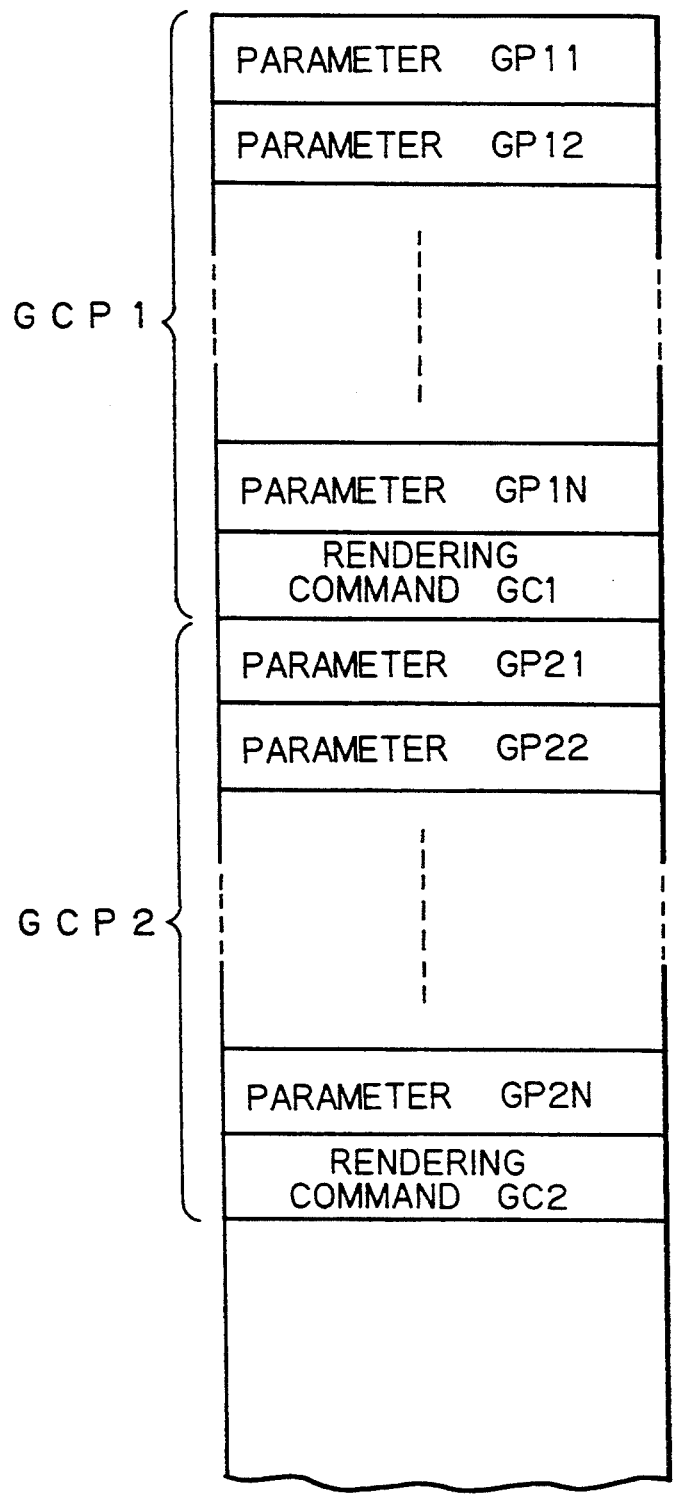
FIG. 6 is an explanatory view in which construction of rendering command packets is shown.

As shown in FIG. 6, rendering command packets GCP1, GCP2 are made up of rendering commands GC1, GC2, and parameters GP11 to GP1N and GP21 to GP2N which are necessary for executing the rendering commands GC1, GC2.

The memory 12 outputs such a rendering command packet GCP on the basis of a control signal from a controller 13. When each of processors LP0 to LP3 is not in the process of rendering or does not yet hold a rendering command packet to be next processed, a high level wait signal WAIT* is produced in the processors LP0 to LP3, and it is applied to the controller 13. In this specification, the symbol "*" means "low active".

When each of the processors LP0, LP1, LP2 and LP3 is in the process of rendering and holds a rendering command packet to be next processed, a low level wait signal WAIT* js produced in the processors LP0 to LP3, and it is applied to the controller 13. The controller 13 controls the memory 12 and the processors LP0 to LP3 so as to supply a next rendering command packet GCP(i+1) to the processors LP0 to LP3 only when it is detected that the wait signal WAIT* is in a high level in all of the processors LP0 to LP3. In each of the processors LP0 to LP3, data on pixels PXij are formed as a result of the rendering. The data on the pixels PXij are output through terminals 14 to 17.

The processors LP0 to LP3 are explained below with reference to FIG. 7.

The processors are three-dimensional primitive creating devices that render a two-dimensional and three-dimensional primitive at a high speed. In receipt of a rendering command packet GCP, they output rendering data for each pixel at the speed of 25M pixels, maximum, per second.

Primitives to be rendered are exemplified by:
line . . . two-dimensional, three-dimensional
triangle . . . two-dimensional, three-dimensional
rectangle . . . two-dimensional, three-dimensional
polygon . . . two-dimensional, three-dimensional
bit map . . . two-dimensional
pixel map . . . two-dimensional
scan line pixels . . . three-dimensional For example, five types of color outputs, if necessary, may be prepared for the above-indicated primitives:
real color (24 bits)
index color (10 bits)
dither color (3 bits, 4 bits)
XP color (1 bit)

Further, the following attributes may be added if necessary:
line pattern (32 bits)
hatch pattern (16×16 bits)
semi-transparent pattern (4×4 bits)
line width (3, 5)

Figure 7:
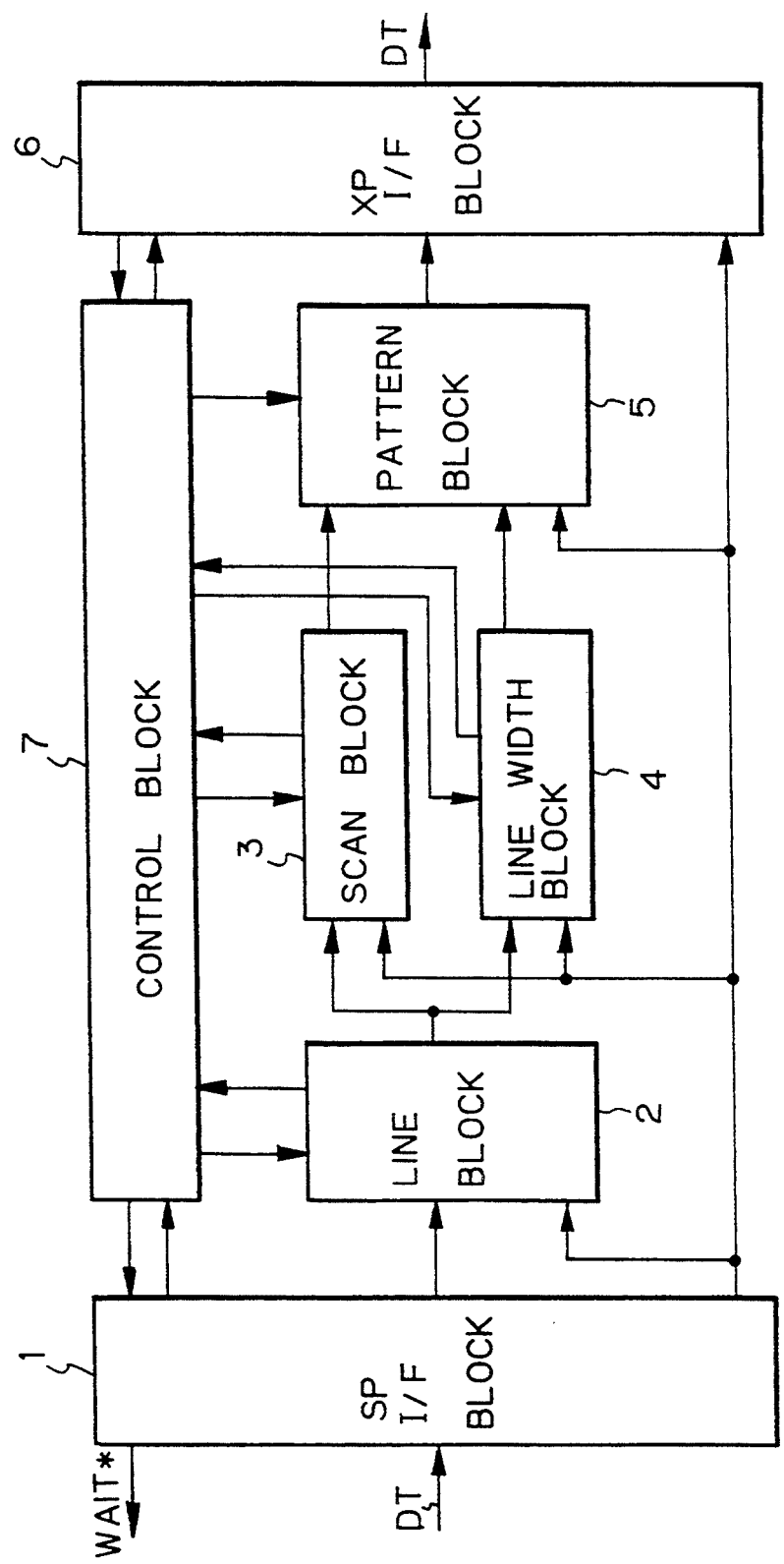
FIG. 7 is a block diagram showing construction of a processor.

As shown in FIG. 7, the processor is generally made up of an SP interface block 1, a line block 2, a scan block 3, a line width block 4, a pattern block 5, an XP interface block 6, a control block 7, and so forth. The SP interface block 1 is for receiving a rendering command packet GCP for creating a primitive. The SP interface block 1 decodes an incoming address and outputs various load signals to respective registers and so on.

Figure 8:
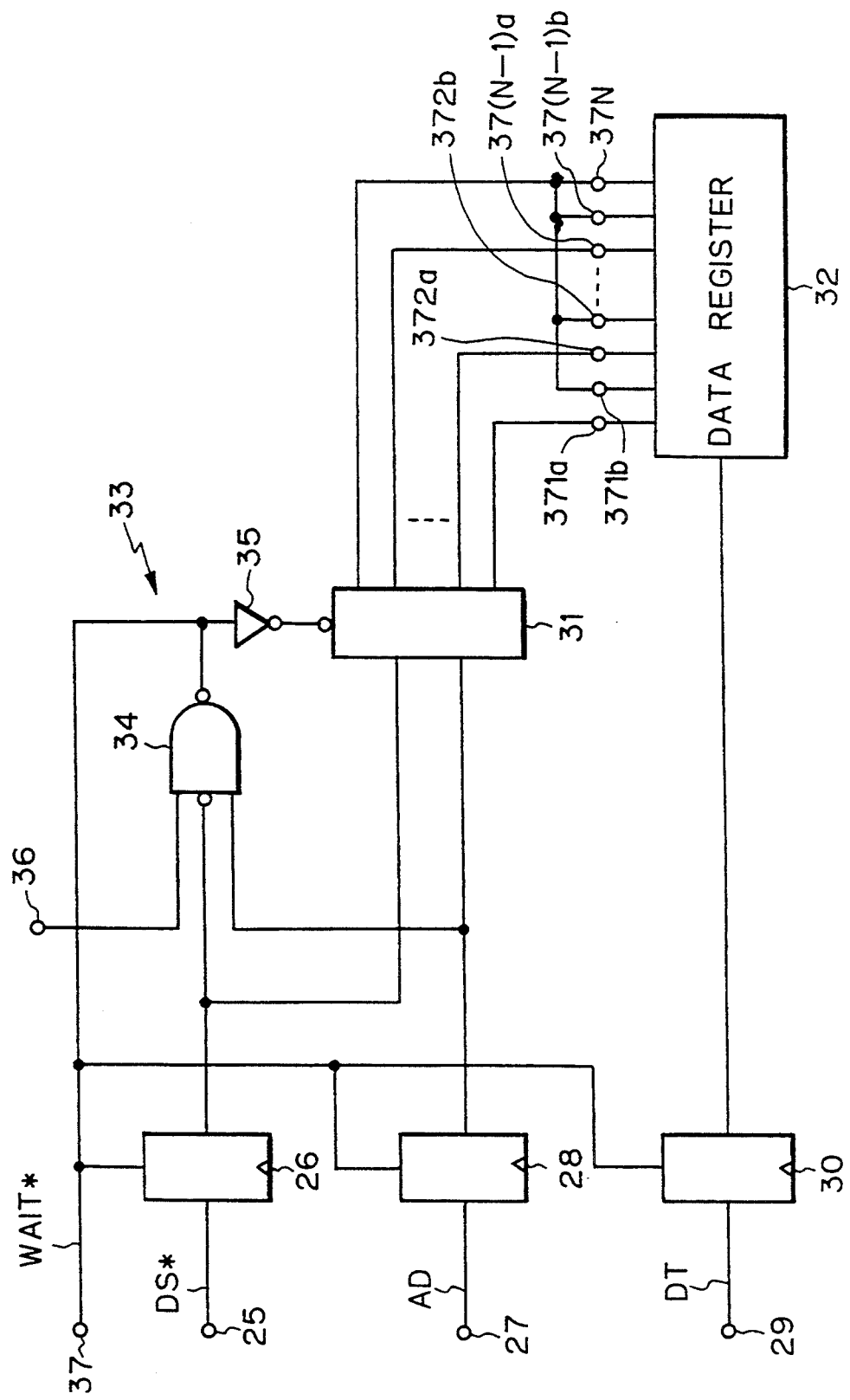
FIG. 8 is a block diagram showing construction of an interface block.

Since the subject matter of the invention lies in the SP interface block 1, construction of the interface block is explained with reference to FIGS. 8 and 9. The SP innerface block 1 is generally made up of a register 26 for holding a data strobe signal DS* supplied through a terminal 25, a register 28 for holding eight-bit address data AD supplied through a terminal 27, a register 30 for holding 48-bit data DT supplied through a terminal 29, a data register section 32 for holding the data DT on the basis of a control signal from a decoder 31, the decoder 31 for creating the control signal for loading the data DT in the data register section 32, and a wait signal producing section 33 for producing a wait signal WAIT*.

The register 26 latches the data strobe signal DS* supplied through the terminal 25 at the timing of a clock pulse PCLK and outputs it to a subsequent stage. The register 26 is controlled to hold the data strobe signal when the wait signal WAIT* is in a low level. An output of the register 26 is applied to a NAND gate 34 of the wait signal producing section 33 in the level-inverted form, and also applied to the decoder 31.

The register 28 latches the eight-bit address data AD supplied through the terminal 27 at the timing of the clock pulse PCLK and outputs it to a subsequent stage. The register 28 is controlled to hold the address data AD when the wait signal WAIT* is in the low level. An output of the register 28 is applied to the decoder 31, and part of the address data AD is applied to the NAND gate 34 of the wait signal producing section 33 to behave as address data indicative of an execute register in the data register section 32 which will be described later.

The register 30 latches the 48-bit data DT supplied through the terminal 29 at the timing of the clock pulse PCLK and outputs it to a subsequent stage. The register 30 is controlled to hold the data DT when the wait signal WAIT* is in the low level. An output of the register 30 is applied to the data register section 32.

The wait signal producing section 33 principally consists of the NAND gate 34 and an inverter 35. The wait signal producing section 33 produces the wait signal WAIT* on the basis of the control signal from the control block 7 and address data indicative of the execute register in the data register section 32.

To the input side of the NAND gate 34 are supplied a signal whose level is inverted from the output level from the register 26, the control signal supplied from the control block 7 through the terminal 36 and maintained in the high level throughout rendering operation, and address data supplied from the register 28 and indicative of the execute register in the data register section 32 which will be described later. The wait signal WAIT* output from the NAND gate 34 is supplied to the decoder 31 through the inverter 35 and output from the terminal 37 to the exterior.

The decoder 31 executes its operation when the data strobe signal DS* is in the low level but stops the operation when it is in the high level. The decoder 31, on the basis of the address data AD, produces a load signal for loading the data DT in a register in the data register section 32. The load signal is supplied to the data register section 32 via terminals 371a, 371b, 372a, 372b, ... 37(N−1)a, 37(N−1)b, and 37N.

Figure 9:
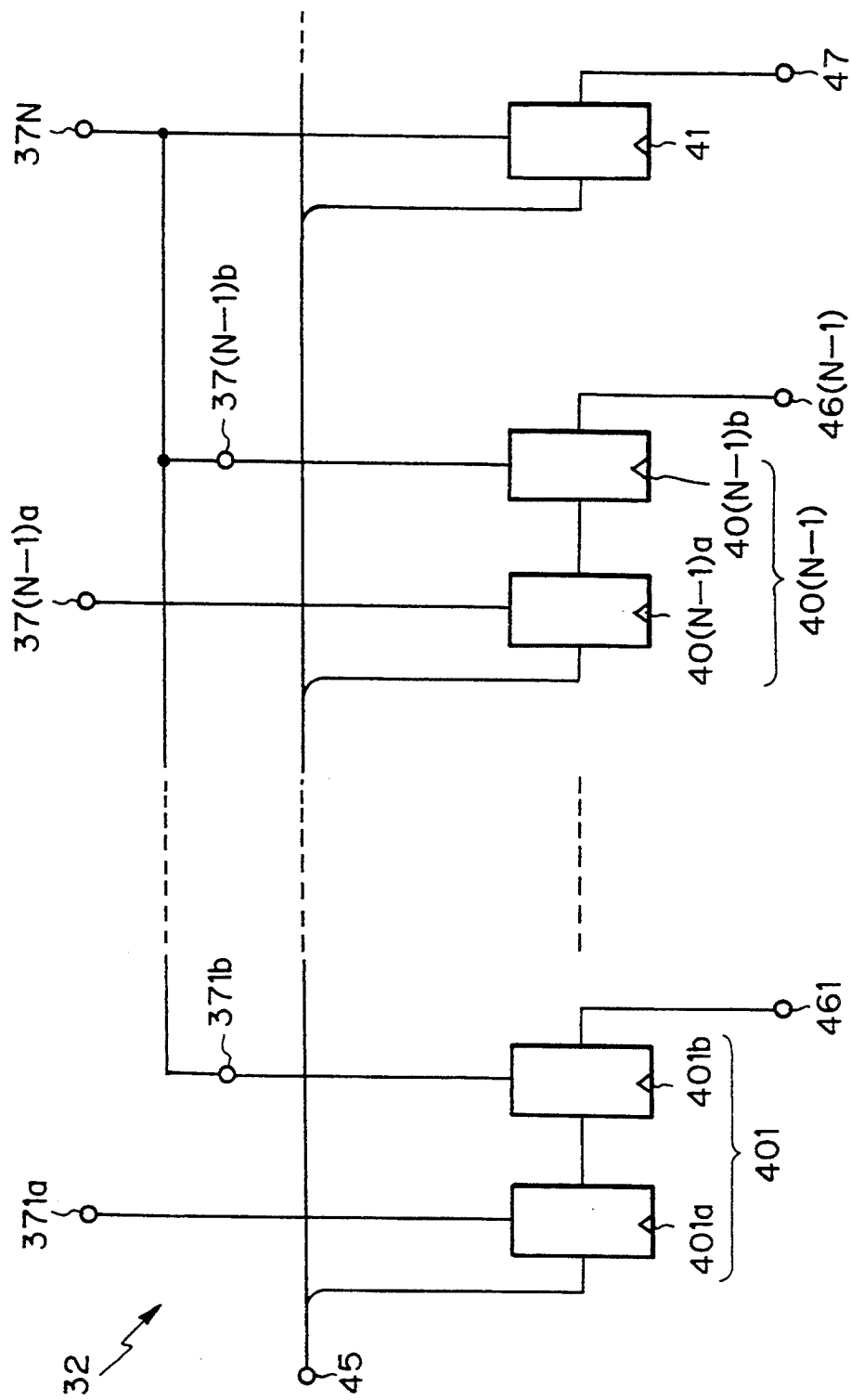
FIG. 9 is a block diagram showing construction of a data register section.

An arrangement of the data register section 32 is shown in FIG. 9. The data register section 32 principally consists of a plurality of data registers 401 to 40(N−1), and an execute register 41. In the following explanation, letter "i" indicates an arbitrary number among 1 to (N−1).

Each of the data registers 40i is made up of a former-stage register 40ia and a latter-stage register 40ib coupled to the former-stage register 40ia. The former-stage register 40ia is coupled to a terminal 37ia, and the latter-stage register 40ib is coupled to a terminal 37ib. The execute register 41 is coupled to a terminal 37N.

Each of the data registers 40i is coupled to the register 30 via a terminal 45. The former-stage register 40ia, which constitutes the data register 40i, is responsive to entry of a low-level load signal to latch the data DT supplied from the register 30 at the timing of the clock pulse PCLK, outputs it to the subsequent stage, and holds the data DT.

The latter-stage register 40ib is responsive to entry of the low-level load signal to latch the data DT supplied from the former-stage register 40ia at the timing of the clock pulse PCLK, outputs it via a corresponding one of the terminal 46a to 46(N−1), and holds the data DT.

The execute register 41 is responsive to entry of the low-level load signal to latch the data DT supplied from the register 30 at the timing of the clock pulse PCLK, outputs it to the subsequent stage, and holds the data DT.

Referring back to FIG. 7, an arrangement of a respective one of processors LP0 to LP3 is explained. Issue of the load signals is prohibited in certain interior status. In this status, the wait signal WAIT* is output to a former-stage circuit block to interrupt entry of data shown at DT in FIG. 7 for a time until the prohibition is released. When the prohibition is released, a load signal is output and issue of the wait signal WAIT* to the former-stage circuit block is stopped.

The line block 2 creates a line and a polygonal contour by using various kinds of algorithm such as Bresenham's algorithm. The scan block 3 scans the interior of a polygon in the X axis direction. That is, it is a block that interpolates received data in the X axis direction. An interpolate circuit is provided for each of data: X, Z, R, G, and B. The line width block 4 creates a thick line. That is, it renders a certain number of pixels encircling X-Y coordinates given by the line block 2.

The pattern block 5 adds attributes such as line patterns, hatch patterns, semitransparent patterns, dither patterns, and so forth, to a created primitive. More specifically, the pattern block 5 has line patterns, hatch patterns, semitransparent patterns, and dither patterns, and refers to these patterns for each pixel to reflect them to each data.

The XP interface block 6 outputs the created primitive for each pixel to a next-stage circuit.

The control block 7 controls the entirety of the processors LP.

Operation of the system is explained below with reference to FIGS. 11 and 12.

Figure 11:
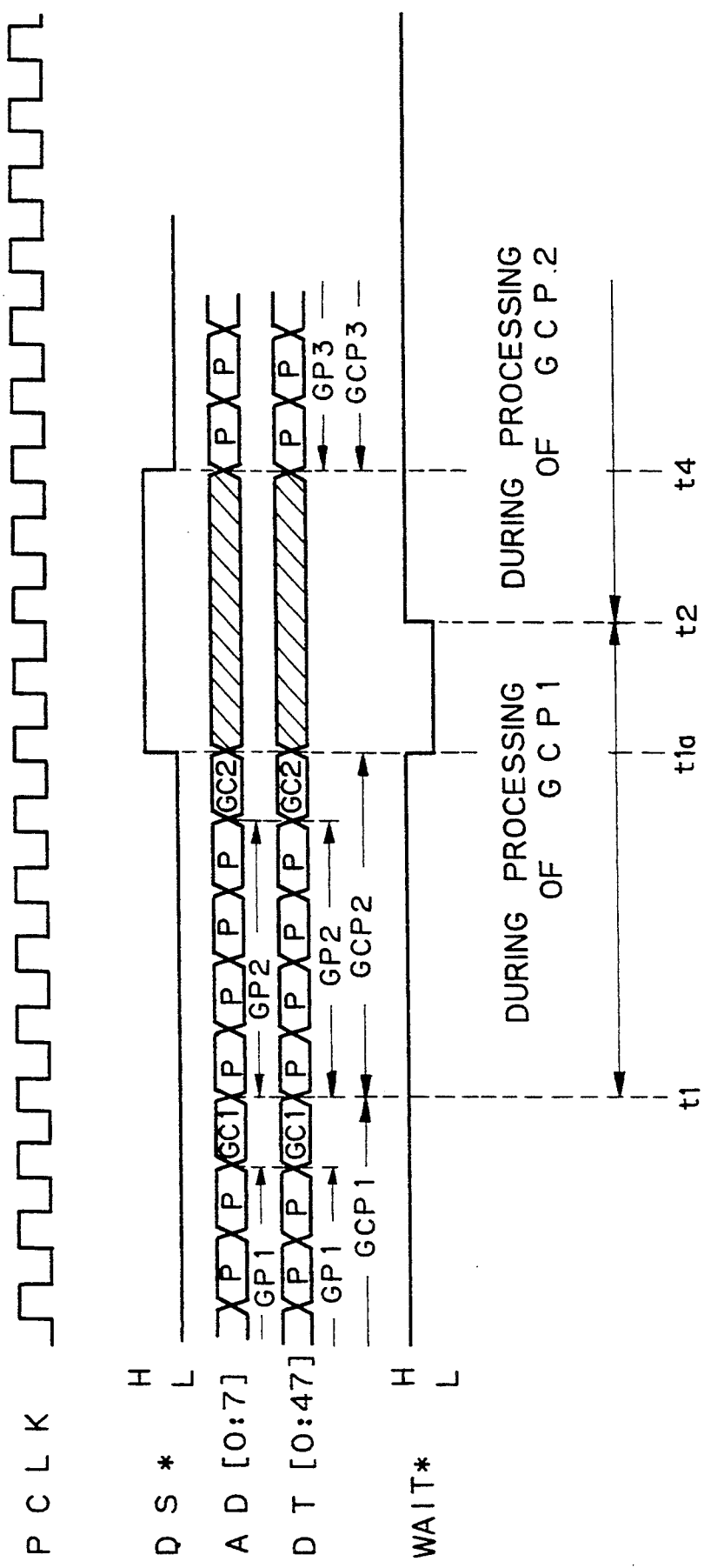
FIG. 11 is a timing chart showing operation of the interface block.

As shown in FIG. 11, on or before the time t1, the high-level wait signal WAIT* is supplied to the controller 13 from each of the processors LP0 to LP3. Therefore, the controller 13 reads from the memory 12 a rendering command packet GCP1 shown in FIG. 6, and gives it to the respective processors LP0 to LP3.

Latch of the data DT, the address data AD, and so forth, is explained as to the processor LP0 taken as an example. Note that latch of the data DT, the address data AD, and so on, is executed in the same manner also in the processors LP1 to LP3. Detailed description thereof is omitted.

A low-level data strobe signal DS* is supplied through the terminal 25, eight-bit address data AD is supplied through the terminal 27, and 48-bit data DT is supplied through the terminal 29.

The address data AD and the data DT are supplied in parallel for each parameter as shown in FIG. 11. As long as the data strobe signal DS* is maintained in the low level, the address data AD, the data DT, and so on, are deemed valid.

On or before the time t1 in FIG. 11, since the registers 26, 28 and 30 are supplied with the high-level wait signal WAIT*, they latch the data strobe signal DS*, the address data AD, the data DT, and so forth, at the timing of the clock pulse PCLK, and output them to a subsequent stage.

The data strobe signal DS* is stored in the register 26, and a level-inverted version thereof, which then represents a high level, is supplied to the NAND gate 34. Further, the data strobe signal DS* is applied to the decoder 31.

The address data AD is stored in the register 28, and it is applied to the decoder 31. Further, part of the address data AD is applied to the NAND gate 34 to behave as address data indicative of the execute register 41 in the data register section 32. The data DT is applied to the former-stage register 40ia in the data register 40i or to the execute register 41, in the data register section 32.

Latch of the address data AD in the register 28 and latch of the data DT in the register 30 and the former-stage register 40ia occurs in the order of the parameter GP1, rendering command GC1, parameter GP2 and rendering command GC2 as shown in FIG. 11.

The decoder 31 selects a data register 40i or the execute register 41 in the data register section 32 on the basis of the address data AD supplied from the register 28. A low-level load signal, for example, is first applied to the former-stage register 40ia in a selected data register 40i. Then the low-level load signal, for example, is applied to the execute register 41 and the latter-stage register 40ib. When the low-level load signal, is supplied from the decoder 31, the former-stage register 40ia in the selected data register 40i latches the data DT of the rendering command packet GCP1 at the timing of the clock pulse PCLK, holds it and outputs it to a next stage.

When the low-level load signal, for example, is supplied from the decoder 31, the latter-stage register 40ib holds the data DT of the rendering command packet GCP1 which has been output from the former-stage register 40ia. The data DT stored in the latter-stage register 40ib is supplied to a next-stage circuit block via terminals 46i and 47, and it is used for rendering. As a result, rendering of the rendering command packet GCP1 is executed from the time t1 in FIGS. 10 and 11.

Figure 10:
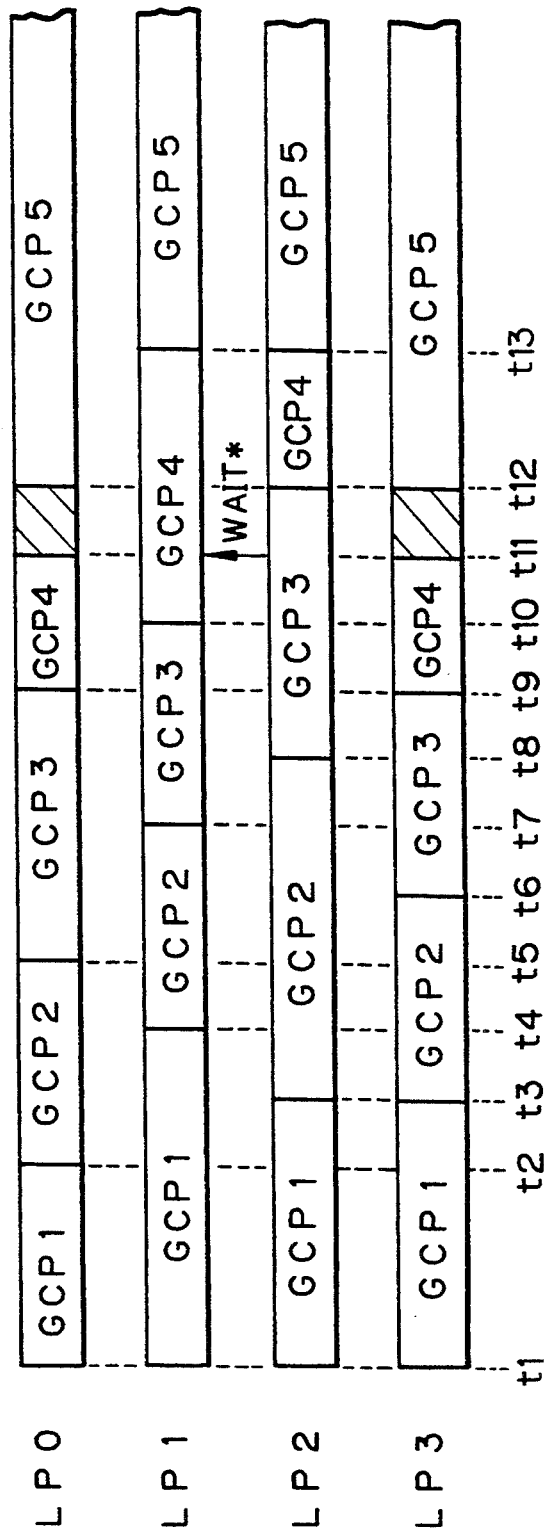
FIG. 10 is an explanatory view which shows processing status and waiting time of a plurality of processors.

FIG. 10 shows rendering status of the rendering command packets GCP from the time t1. In the rendering period from the time t1, the contents of the latter-stage register 40ib in the data register 40i, that is, the data DT of the rendering command packet GCP1 is held intact. The next-stage circuit block refers only to the contents of the latter-stage register 40ib.

As shown in FIG. 11, in the period as from the time t1 in which processing of the rendering command packet GCP1 is processed, data DT on the parameter GP1 of the rendering command packet GCP1 is held in the latter-stage data register 40ib of the data register 40i. Therefore, the next rendering command packet GCP2 can be stored in the former-stage register 40ia of the data register 40i.

As shown in FIG. 10, since all of the processors LP0 to LP3 carry out the rendering from the time t1, the controller 13 supplies the rendering command packet GCP2 successively from the time t1 after completion of the supply of the rendering command packet GCP1 to the respective processors LP0 to LP3.

As shown in FIG. 11, the rendering command packet GCP2 is loaded in the respective processors LP0 to LP3 in the same manner as the foregoing rendering command packet GCP1. Loading of the rendering command packet GCP2 in the processors LP0 to LP3 continues up to the time t1a. As a result, data DT on the rendering command packet GCP2 is prefetched in the former-stage register 40ia of the data register 40i in the data register section 32 of each of the processors LP0 to LP3 at the timing of the clock pulse PCLK.

When the prefetch of the rendering command packet GCP2 is completed, each of the processors LP0 to LP3 holds the wait signal WAIT* in the low level from the time t1a to prohibit entry of the rendering command packet GCP3 subsequent to the rendering command packet GCP2, and applies the wait signal WAIT* to the controller 13.

At the time t1a in FIG. 11, the low-level wait signal WAIT* is output, and the data strobe signal DS* rises to the high level. As a result of the rising of the data strobe signal DS* to the high level, data in the high level period is invalidated. The wait signal WAIT* is held in the low level until the time t2 where rendering of the rendering command packet GCP1 is completed, as shown in FIG. 11. When the controller 13 detects that at least one of the processors LP0 to LP3 has output the low-level wait signal WAIT*, it stops output of the rendering command packet GCP3 from the memory 12.

As shown in FIGS. 10 and 11, processing of the rendering command packet GCP1 by the processor LP0 is completed at the time t2. As a result, the wait signal WAIT* of the processor LP0 is released to rise to the high level. In each of the processors LP, when processing of the rendering command packet GCP1 is completed, the wait signal WAIT* rises to the high level, and the low-level load signal, for example, is supplied from the decoder 31 to the latter-stage register 40ib. As a result, data DT on the rendering command packet GCP2 held in the former-stage register 40ia of each data register 40i is transferred to the latter-stage register 40ib.

The data DT on the rendering command packet GCP2 stored in the latter-stage register 40ib is applied to a next-stage circuit block via terminals 46a and 47, and it is used for rendering. As a result, as shown in FIG. 10, rendering of the rendering command packet GCP2 is started by the processor LP0 from the time t2, by the processors LP2 and LP3 from the time t3 and by the processor LP1 from the time t4.

During the rendering period from the time t2, the contents of the latter-stage register 40ib of the data register 40i, that is, data DT on the rendering command packet GCP2, is held intact. The next-stage circuit block refers only to the contents of the latter-stage register 40ib. The next rendering command packet GCP3 can be loaded in the former register 40ia of each data register 40i. Then the controller 13, in the same manner as for the rendering command packet GCP1, controls the memory 12 and the processors LP0 to LP3 to permit loading of the rendering command packet GCP3 in the processors LP0 to LP3 during the rendering of the rendering command packet GCP2.

As described above, in order for a new rendering command packet GCP(i+1) to be latched in the processors LP0 to LP3, it is essential that all of the processors LP0 to LP3 have undertaken processing of the rendering command packet GCP(i). Therefore, latch of the rendering command packet GCP3 occurs as from the time t4 in FIG. 10. In the same manner, latch of the rendering command packet GCP4 occurs as from the time t8.

As shown in FIG. 10, the time of latch of the rendering command packet GCP5 occurs from the time t12. This is explained below.

The processors LP0 and LP3 start processing the rendering command packet GCP4 from the time t9 while the processor LP1 starts processing the rendering command packet GCP4 from the time t10. The processor LP2, however, is still processing the rendering command packet GCP3 at the time when the processors LP0, LP1 and LP3 already executed or have completed processing of the rendering command packet GCP4. Therefore, the wait signal WAIT* output from the processor LP2 in relation to the rendering command packet GCP3 is held in the low level. As a result, at the time t11, the controller 13 detects that the wait signal WAIT* has been output in the low level from the processor LP2, and stops output of the rendering command packet GCP5 from the memory 12. Then, although processing of the rendering command packet GCP4 has been completed in the processors LP0 and LP3 at the time t11, the rendering command packet GCP5 is not supplied, and the processors LP0 and LP3 are held in waiting status in the period from the time t11 to t12.

As shown in FIG. 10, at the time t12, processing of the rendering command packet GCP4 is started in the processor LP2, and the wait signal WAIT* output from the processor LP2 is released to rise to the high level. Under control by the controller 13, the rendering command packet GCP5 is output from the memory 12 from the time t12. Latch of the rendering command packet GCP5 in the processors LP0 to LP3 is commenced from the time t12. The processors LP0 and LP3 start processing the rendering command packet GCP5 from the time t12 while the processors LP1 and LP2 start processing the rendering command packet from the time t13.

Figure 12:
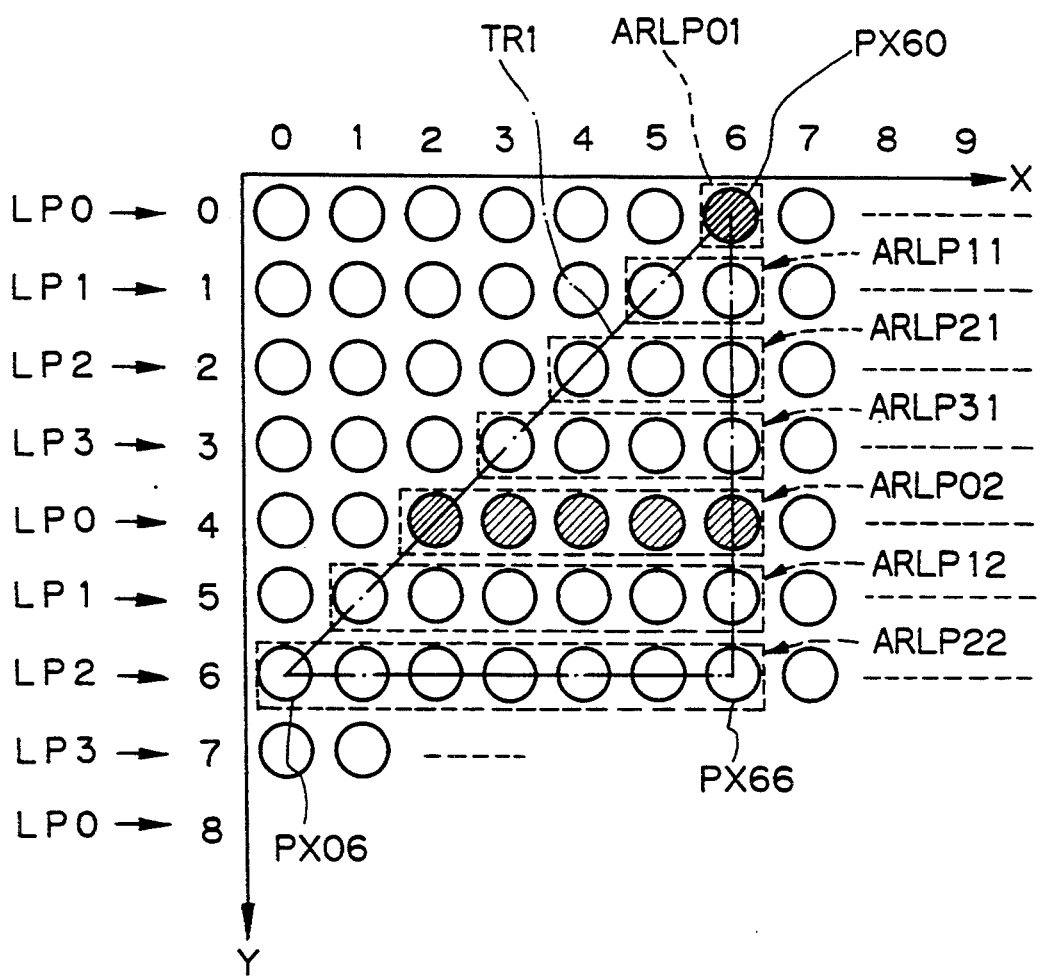
FIG. 12 is an explanatory view showing an example in which a triangle is rendered by the plurality of processors.

As a result, rendering of a triangle TR1 shown in FIG. 12 is executed. The processors LP0 to LP3 create, for example, the triangle TR1 shown in FIG. 12 on the basis of the rendering command packets GCP supplied. Creation of the triangle TR1 is realized by the respective processors LP0, LP1, LP2 and LP3 which create pixels PXij in districts assigned to the respective processors LP0, LP1, LP2 and LP3 among pixels PXij forming the triangle TR1.

In FIG. 12, the abscissa is the X axis and the ordinate is the Y axis. Numerals attached to the X and Y axes indicate coordinate data X, Y) on the X-Y coordinate plane. A figure instructed by the rendering command packet GCP is a triangle TR1 having pixels PX60, PX66, and PX06 as its vertices as shown in FIG. 12.

In FIG. 12, the processor LP0 creates pixels necessary for representing the triangle TR1 defined by designated vertices when the Y coordinate data is "0", "4" and "8". For example, when the Y coordinate data is "0", the pixel PX60 in an area ARLP01 is created. When the Y coordinate data is "4", pixels PX24, PX34, PX44, PX54 and PX64 forming an area ARLP02 are created.

In the same manner, the other processors LP1, LP2 and LP3 also create pixels PXij in districts assigned to the respective processors LP1, LP2 and LP3. That is, the processor LP1 creates pixels forming areas ARLP11 and ARLP12 when the Y coordinate data is "1", "5", ... The processor LP2 creates pixels forming areas ARLP21 and ARLP22 when the Y coordinate data is "2", "6", ... The processor LP3 creates pixels forming areas ARLP31, ... when the Y coordinate data is "3", "7", ...

According to the embodiment, in the case where rendering is executed in parallel by a plurality of processors LP0 to LP3 coupled in parallel, data DT on a rendering command packet GCP(i) under current rendering is held in the latter-stage register 40ib in the data register 40i in each of the processors LP0 to LP3, while data DT on a rendering command packet GCP(i+1) to be next processed is prefetched by the former-stage register 40ia. Therefore, one or more of the processors LP that have completed processing of the current rendering command packet GCP(i) can undertake processing of the next rendering command packet GCP(i+1), and each of the processors LP0 to LP3 can process rendering command packets GCP in a successive manner. This contributes to removal or significant reduction of waiting time occurring in the respective processors LP0 to LP3, and leads to an improvement of the entire processing speed of the system.

Further, according to the embodiment, since the data DT on the rendering command packet GCP(i+1) to be next processed is latched in the former-stage register 40ia of the data register 40i in each processor LP during rendering, also when rendering is done by using a single processor LP, for example, the processor LP0, the data DT on the rendering command packet GCP(i+1) to be next processed can be latched during the rendering time, which improves the processing capacity and efficiency.

In addition, since this embodiment uses the latter-stage register 40ib in addition to the former-stage register 40ia, parameters that were used for a preceding rendering command GC can be used for current rendering and need not be re-loaded.

Figure 13:
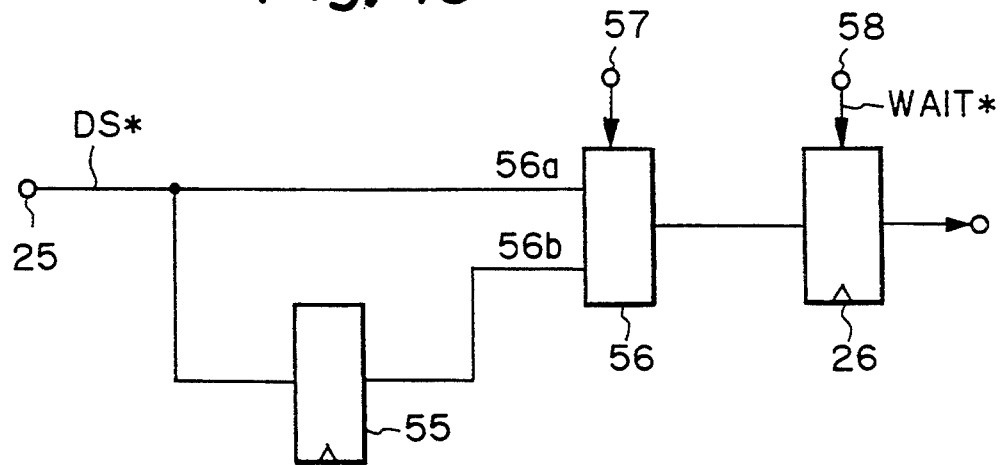
FIG. 13 is a block diagram showing a further embodiment.
Figure 14:
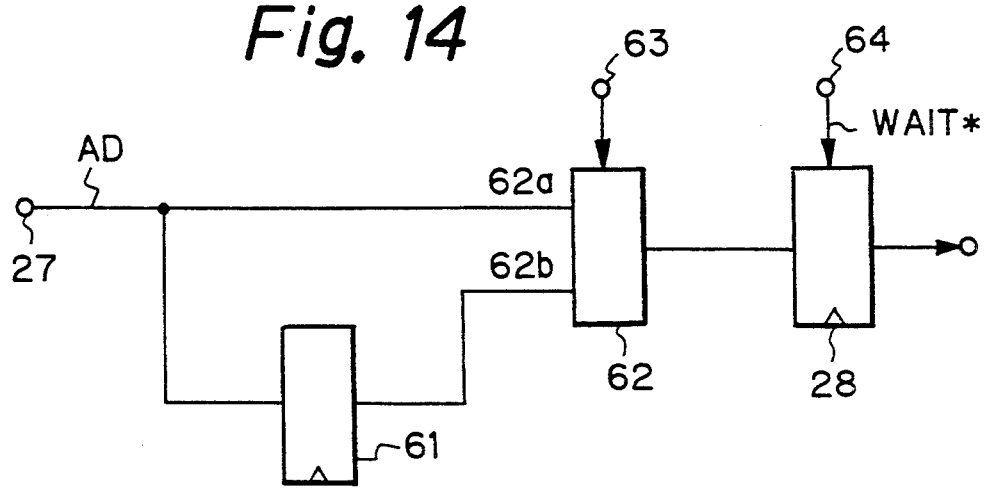
FIG. 14 is a block diagram of the further embodiment.
Figure 15:
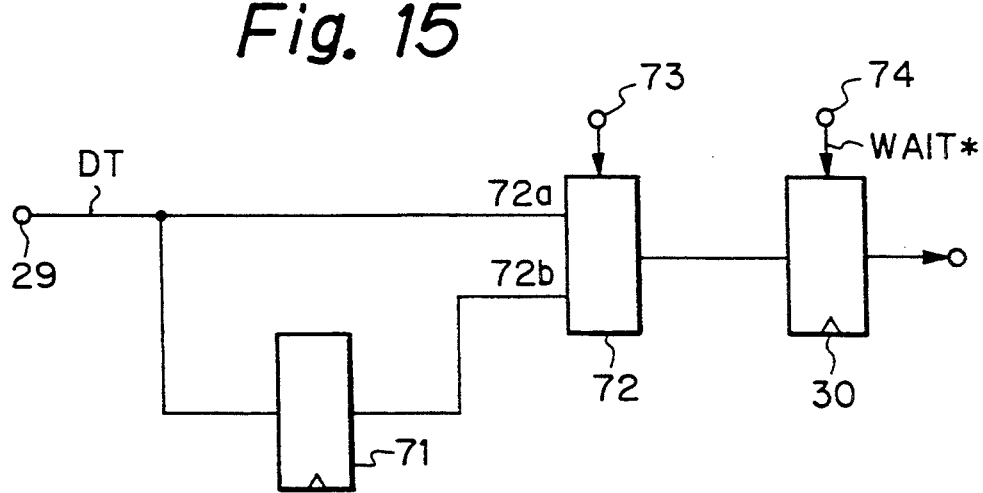
FIG. 15 is a block diagram of the further embodiment.

FIGS. 13 to 15 are views showing a further embodiment of the invention. Elements common to the foregoing embodiment are labeled with the same numerals, and their redundant explanation is omitted. The further embodiment is different from the foregoing embodiment in that one-stage buffer registers are provided in precedence of the register 26 for holding the data strobe signal DS*, the register 28 for holding the address data AD, and the register 30 for holding the data DT. This is to give time corresponding to one cycle of the clock pulse PCLK in the event that it is difficult for the controller 13 shown in FIG. 5 to immediately change the operating status when it detects the wait signal WAIT* output from the respective processors LP0 to LP3.

FIG. 13 shows construction of a portion for holding the data strobe signal DS*. In the construction of FIG. 13, the data strobe signal DS* is supplied via the terminal 25. The data strobe signal DS* is applied to a buffer register 55 and one 56a of the terminals of a selector 56. In the same manner as the register 26, the buffer register 55 is controlled to latch the incoming data strobe signal DS* at the timing of the clock pulse PCLK, outputs it to the subsequent stage and holds the data strobe signal DS* when the wait signal WAIT* is in the low level. The data strobe signal DS* output from the buffer register 55 is applied to the other terminal 56b of the selector 56.

Connected status of the selector 56 is controlled by a control signal supplied from the control block 7 via the terminal 57. The data strobe signal DS* selected by the selector 56 is applied to the register 26. When the wait signal WAIT* supplied through a terminal 58 is in the low level, the data strobe signal DS* is held in the register 26.

FIG. 14 shows construction of a portion for holding the address data AD. In the construction of FIG. 14, the address data AD is supplied via the terminal 27. The address data AD is applied to a buffer register 61 and one 62a of the terminals of a selector 62. In the same manner as the register 28, the buffer register 61 is controlled to latch the incoming address data AD at the timing of the clock pulse PCLK, outputs it to the subsequent stage and holds the address data AD when the wait signal WAIT* is in the low level. The address data output from the buffer register 61 is applied to the other terminal 62b of the selector 62.

Connected status of the selector 62 is controlled by the control signal supplied from the control block 7 via a terminal 63. The address data AD selected by the selector 62 is applied to the register 28. When the wait signal WAIT* supplied through a terminal 64 is in the low level, the address data AD is held in the register 28.

FIG. 15 shows construction of a portion for holding the data DT. In the construction of FIG. 15, data DT is supplied through the terminal 29. The data DT is applied to a buffer register 71 and one 72a of the terminals of a selector 72. The buffer register 71 is controlled to latch the incoming data DT at the timing of the clock pulse PCLK, outputs it to the subsequent stage and holds the data DT when the wait signal WAIT* is in the low level. The data DT output from the buffer register 71 is applied to the other terminal 72b of the selector 72.

Connected status of the selector 72 is controlled by the control signal supplied from the control block 7 via a terminal 73. The data DT selected by the selector 72 is applied to the register 30. When the wait signal WAIT* supplied through a terminal 74 is in the low level, the data DT is held in the register 30.

Operation of the further embodiment is explained below with reference to FIG. 16. For simplifying the explanation, let the system have only one processor.

Figure 16:
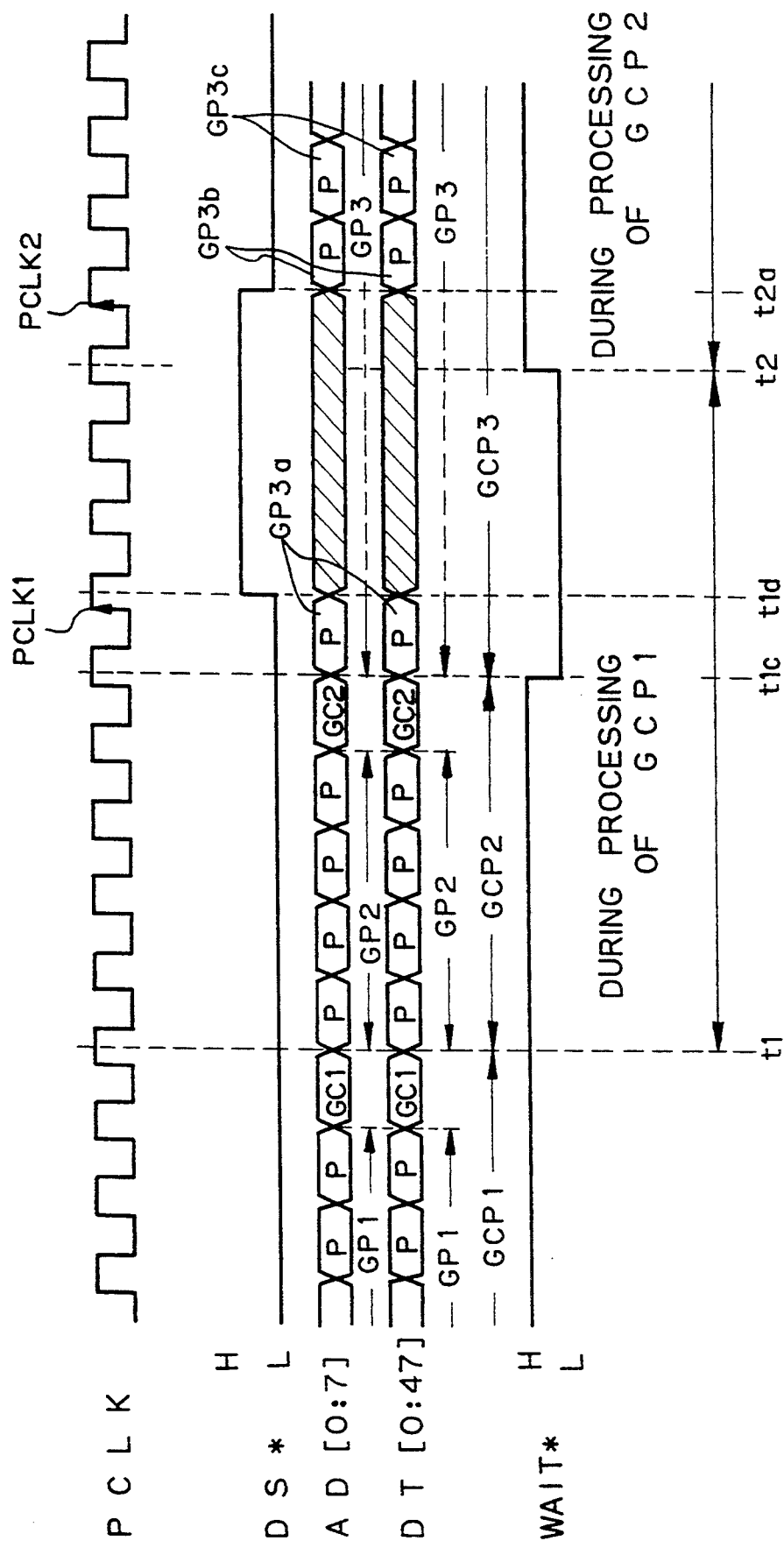
FIG. 16 is a timing chart showing the operation of an interface block in another embodiment.

In the period up to the time t1, the data strobe signal DS* is held in the low level as shown in FIG. 16, which indicates the data is valid. In the period up to the time t1, the wait signal WAIT* is held in the high level as shown in FIG. 16, which indicates that various kinds of data supplied can be accepted.

As shown in FIG. 16, the rendering command packet GCP1 is accepted up to the time t1, and the rendering command packet GCP2 is accepted from the time t1 to t1c. Acceptance of the rendering command packets GCP1 and GCP2 is effected in the same manner as the foregoing embodiment. Redundant explanation is therefore omitted.

At the time t1c in FIG. 16, the data register 40i has already latched the parameter GP2 and the rendering command GC2 of the rendering command packet GCP2 to be next processed, in addition to the parameter GP1 and the rendering command GC1 of the rendering command packet GCP1 under current rendering. At the time t1c, the wait signal WAIT* descends from the high level to the low level. That is, a low-level wait signal WAIT* is supplied from the processor LP0 to the controller 13 in order to stop transfer of the rendering command packet GCP3.

When the low-level wait signal WAIT* is detected, the controller 13 stops the supply of the rendering command packet GCP3 to the processor LP0 from the time t1d. At the same time, the control block 7 applies a control signal to the selectors 56, 62 and 72. As a result, the selector 56 is connected via the terminal 56b, the selector 62 via the terminal 62b, and the selector 72 via the terminal 72b.

As shown in FIG. 16 and referred to above, it is difficult for the controller 13 to immediately change the operating status when the wait signal WAIT* output from the processor LP0 is detected. Therefore, in the period from the time t1c to t1d, a parameter GP3a of the rendering command packet GCP3 corresponding to one clock pulse PCLK is supplied to the processor LP0. The parameter GP3a of the rendering command packet GCP3, the level of data strobe signal DS*, and so on, in the period from the time t1c to t1d are latched in the buffer registers 55, 61 and 71 at the rising edge of a clock pulse PCLK1 and held by them. For example, the parameter GP3a of the rendering command packet GCP3 is held in the buffer registers 61 and 71, and the level (low level in FIG. 16) of the data strobe signal DS* is held in the buffer register 55.

From the time t1d to t2a, the data strobe signal DS* rises to the high level, and the data in this period is invalidated. From the time t1 to t2, rendering of the rendering command packet GCP1 is executed. Circuit arrangements subsequent to the registers 26, 28 and 30 and processing of signals, data and so on in these circuits are the same as the foregoing embodiment. Redundant explanation is therefore omitted. At the time t2, the wait signal WAIT* rises to the high level.

At the time t2, a high-level wait signal WAIT* is applied from the processor LP0 to the controller 13. The controller 13 resumes supply of the rendering command packet GCP to the processor LP0 from the time t2a on the basis of the wait signal WAIT*.

As described above, since the selectors 56, 62 and 72 are connected via their terminals 56b, 62b and 72b, the data strobe signal DS*, the parameter GP3a, and so forth, which are held in the buffer registers 55, 61 and 71 in the period from the time t1c to t1d, are sent to the registers 26, 28 and 30 via the selectors 56, 62 and 72. That is, the level (low level) of the data strobe signal DS* is latched in the register 26, and the parameter GP3a of the rendering command packet GCP3 is latched in the registers 28 and 30.

When latch of the data from the buffer registers 55, 61 and 71 is completed, the control block 7 applies a control signal to the selectors 546, 62 and 72. As a result, the connected status of the selectors 56, 62 and 72 is controlled by the time t2a. That is, the selector 56 is connected via the terminal 56a, the selector 62 via the terminal 62a, and the selector 72 via the terminal 72a. Therefore, in the period from the time t2 to t2a, the registers 26, 28 and 30 hold and output data in the period from the time t1c to t1d. As from the time t2b, a parameter GP3b and subsequent parameters GP3c, ... of the rendering command packet GCP3 are held and output and output.

Since the data strobe signal DS* from the time t1c to t1d is held in the low level, the data in this period is valid. Based on this, the parameter GP3a of the time t1c to t1d is valid and sent to the next stage. Since the data strobe signal DS* after the time t2a is held in the low level, the data in this period is valid. Based on this, parameters GP3b, GP3c, ... after the time t2a are valid and sent to the next stage. As a result, the rendering command packet GCP3 is sent to the registers 26, 28 and 30 and subsequent circuits without being interrupted. As shown in FIG. 16, rendering of the rendering command packet GCP2 is executed after the time t2. Arrangement of circuits subsequent to the registers 26, 28 and 30 and processing of signals or data in the circuits are the same as the foregoing embodiment. Redundant explanation is therefore omitted.

In addition to the foregoing embodiment, the further embodiment gives time to the timing for interface with the exterior because the parameter GP3a of the rendering command packet GCP3 corresponding to one clock pulse PCLK is held in each of the processors LP0 to LP3 after a low-level wait signal WAIT* is output from the processors LP at the time t1c.

According to the rendering system established by the invention, a processor that has completed processing of a current rendering command packet can undertake processing of a next rendering command packet, and each processor can execute successive processing of rendering command packets. Therefore, removal or significant reduction of waiting time is possible, and the entire processing speed of the system is improved.

Further, since a rendering command packet to be next processed can be latched during rendering of a current rendering command packet, processing capacity and efficiency are improved even when rendering is done by using a single processor.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A system for processing rendering command packets, comprising:
   a plurality of primitive creating means coupled for parallel processing, operative to generate rendering data from the execution of at least a portion of each of successive ones of the rendering command packets, each rendering command packet including a rendering command and at least one rendering parameter;
   a plurality of prefetch means, one of each of the plurality of prefetch means coupled to a corresponding one of the plurality of primitive creating means, each of the plurality of prefetch means operative to receive a first rendering command packet and a second rendering command packet, the second rendering command packet temporally following the first rendering command packet, at least one of the plurality of prefetch means operative to start, within its corresponding primitive creating means, processing of the second rendering command packet prior to the completion of processing of the first rendering command packet by another of the plurality of primitive creating means, each of the prefetch means including an input interface, each input interface including a data input register, a data register in which said rendering parameter is set, an execute register in which a rendering command of the first rendering command packet is stored, and a signal generator responsive to a rendering command of the second rendering command packet received during processing of the rendering command of the first rendering command packet, the signal generator operative to generate a first signal indicating that no addition rendering commands be accepted by the input interface and to generate a second signal for indicating when processing of the rendering command of the first rendering command packet has been completed;
   a buffer register operative to store at least one of the rendering command and the rendering parameter; and
   a selector having a first input coupled to an input of the buffer register and a second input coupled to an output of the buffer register, the selector operative to selectively couple one of the first and second inputs of the selector to an input of the data input register.

2. The system according to claim 1 wherein a separate one of the plurality of primitive creating means is assigned to a respective pixel district for the generation of rendering data in response to each successive rendering command packet.

3. The system according to claim 1, wherein said data register comprises:
   a first stage and a second stage, the first and second stages coupled to copy to the second stage, upon loading of a second rendering parameter in the first stage, a first rendering parameter stored in the first stage.

4. A method of processing rendering command packets, comprising the steps of:
   parallel processing within a plurality of primitive creating means to generate rendering data from the execution of at least a portion of successive ones of the rendering command packets, each rendering command packet including a rendering command and at least one rendering parameter;
   receiving a first rendering command packet and a second rendering command packet within a plurality of prefetch means, one of each of the plurality of prefetch means coupled to a corresponding one of the plurality of primitive creating means, the second rendering command packet temporally following the first rendering command packet;
   starting processing of the second rendering command packet after processing of the first rendering command packet in at least one of the plurality of primitive creating means, the processing of the second rendering command packet starting prior to the completion of processing of the first rendering command packet by another of the plurality of primitive creating means;
   generating a first signal in response to a rendering command of the second rendering command packet received during processing of the rendering command of the first rendering command packet, the signal indicating that no additional rendering commands be accepted;
   generating a second signal for indicating when processing of the rendering command of the first rendering command packet has been completed;
   setting within a data register a rendering parameter;
   storing within an execute register a rendering command of the first rendering command packet;
   storing within a buffer register at least one of the rendering command and the rendering parameter; and
   selectively coupling one of an input and an output of the buffer register to an input of a data input register.

5. The method according to claim 4 further comprising the step of:
   generating rendering data for a respective pixel district within a separate one of the plurality of primitive creating means in response to each rendering command packet.

6. The method according to claim 4, further comprising the steps of:
   copying to a second stage of the data register, upon loading of a second rendering parameter in a first stage of the data register, a first rendering parameter stored in the first stage of the data register.

* * * * *